(12) United States Patent
Gobara

(10) Patent No.: US 8,265,124 B2
(45) Date of Patent: Sep. 11, 2012

(54) RECEIVED SIGNAL DETERMINATION METHOD, POSITIONING DEVICE, AND ELECTRONIC INSTRUMENT

(75) Inventor: Naoki Gobara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 913 days.

(21) Appl. No.: 12/268,745

(22) Filed: Nov. 11, 2008

(65) Prior Publication Data

US 2009/0129449 A1    May 21, 2009

(30) Foreign Application Priority Data

Nov. 20, 2007   (JP) .................................. 2007-300189

(51) Int. Cl.
*H04B 1/707* (2006.01)
(52) U.S. Cl. .......... 375/150; 375/147; 375/140; 375/342
(58) Field of Classification Search .................. 375/150, 375/147, 140, 342; 455/456.6, 65, 456.1; 370/386, 450, 453; 342/357.02
See application file for complete search history.

(56) References Cited

U.S. PATENT DOCUMENTS

| 6,078,290 A * | 6/2000 | McBurney et al. ............ 342/417 |
| 6,782,041 B1 * | 8/2004 | Aihara ........................... 375/150 |
| 7,043,257 B2 * | 5/2006 | Nohara ...................... 455/456.6 |
| 2003/0179813 A1 * | 9/2003 | Morita et al. ................. 375/148 |
| 2008/0291113 A1 * | 11/2008 | Ou-Yang ....................... 343/876 |
| 2009/0289841 A1 * | 11/2009 | Nakamoto et al. ........ 342/357.02 |

FOREIGN PATENT DOCUMENTS

| JP | 2003-098244 A | 4/2003 |
| WO | WO-2006/060605 A2 | 6/2006 |

OTHER PUBLICATIONS

Bo Zheng et al.; GPS Software Receiver Enhancements for Indoor Use; ION GNSS 18th International Technical Meeting of the Satellite Division, Sep. 13-16, 2005, Long Beach, CA; pp. 1138-1142.

* cited by examiner

*Primary Examiner* — Shuwang Liu
*Assistant Examiner* — Helene Tayong
(74) *Attorney, Agent, or Firm* — Global IP Counselors, LLP

(57) ABSTRACT

A received signal determination method includes: receiving a positioning signal; performing correlation calculations on the received positioning signal using a code replica of one spreading code among the plurality of spreading codes; selecting a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase; changing a threshold value condition for the total peak value based on the remote peak value; and determining whether or not the received positioning signal is spread-modulated with the one spreading code by determining whether or not the total peak value satisfies the threshold value condition.

11 Claims, 10 Drawing Sheets

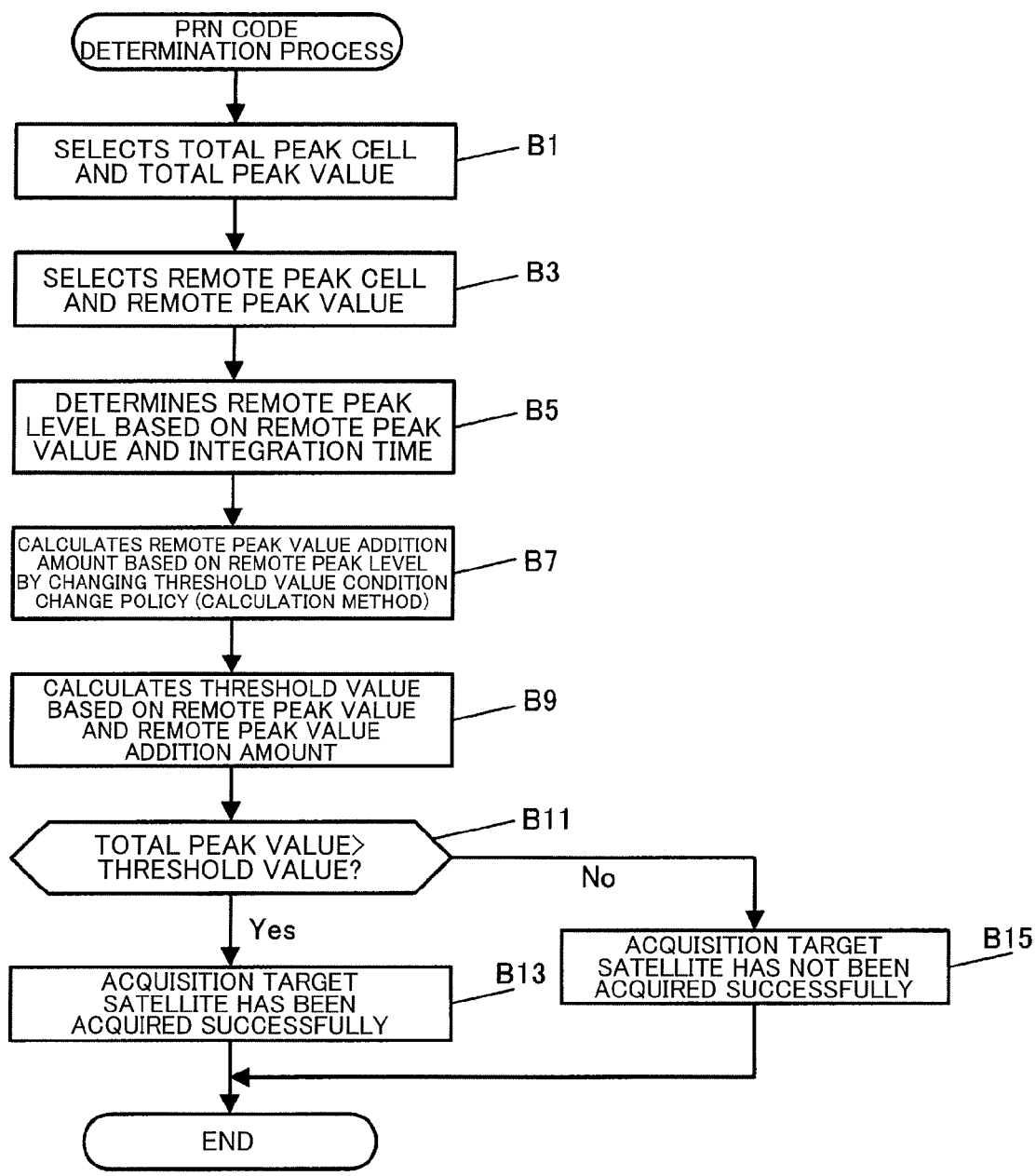

RECEIVED SIGNAL DETERMINATION METHOD, POSITIONING DEVICE, AND ELECTRONIC INSTRUMENT

Japanese Patent Application No. 2007-300189 filed on Nov. 20, 2007, is hereby incorporated by reference in its entirety.

BACKGROUND

The present invention relates to a received signal determination method, a positioning device, and an electronic instrument.

The global positioning system (GPS) is widely known as a satellite positioning system. The GPS is utilized for a positioning device provided in a portable telephone, a car navigation system, and the like. A GPS positioning device acquires and tracks a GPS satellite signal transmitted from a GPS satellite, decodes a navigation message included in the GPS satellite signal, and calculates a pseudo-range based on GPS satellite orbit information and time information included in the decoded navigation message to calculate the current position of the GPS positioning device.

The GPS positioning device acquires the GPS satellite signal (GPS satellite) by performing correlation calculations on the received signal and a code replica. The code replica is a signal that is pseudo-generated by the GPS positioning device and simulates a pseudo random noise (PRN) code included in the acquisition target GPS satellite signal. If the acquisition target GPS satellite signal is correct, the PRN code included in the GPS satellite signal coincides with the code replica. If the acquisition target GPS satellite signal is incorrect, the PRN code included in the GPS satellite signal does not coincide with the code replica. Therefore, the GPS positioning device can determine whether or not the GPS satellite signal has been acquired successfully based on the correlation value calculated by correlation calculations.

In general, a given threshold value is set in advance, and the GPS positioning device determines that the GPS satellite signal has been acquired successfully when the correlation value calculated by correlation calculations has exceeded the threshold value. However, even if the PRN code included in the GPS satellite signal does not coincide with the code replica, the correlation value may exceed the threshold value in an environment in which a strong signal can be received, for example. Therefore, the GPS positioning device may incorrectly determine that the GPS satellite signal has been acquired successfully. This phenomenon is referred to as cross-correlation, and may decrease the positioning accuracy to a large extent.

As technology that solves this problem, JP-A-2003-98244 discloses technology that detects cross-correlation using the difference in Doppler frequency between signals received from GPS satellites.

SUMMARY

According to one aspect of the invention, there is provided a method comprising:

receiving a positioning signal;

performing correlation calculations on the received positioning signal using a code replica of one spreading code among the plurality of spreading codes;

selecting a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;

changing a threshold value condition for the total peak value based on the remote peak value; and determining whether or not the received positioning signal is spread-modulated with the one spreading code by determining whether or not the total peak value satisfies the threshold value condition.

BRIEF DESCRIPTION OF THE DRAWINGS

FIG. 17 is a flowchart showing the flow of a PRN code determination process.

DESCRIPTION OF EXEMPLARY EMBODIMENTS

Figure 1:
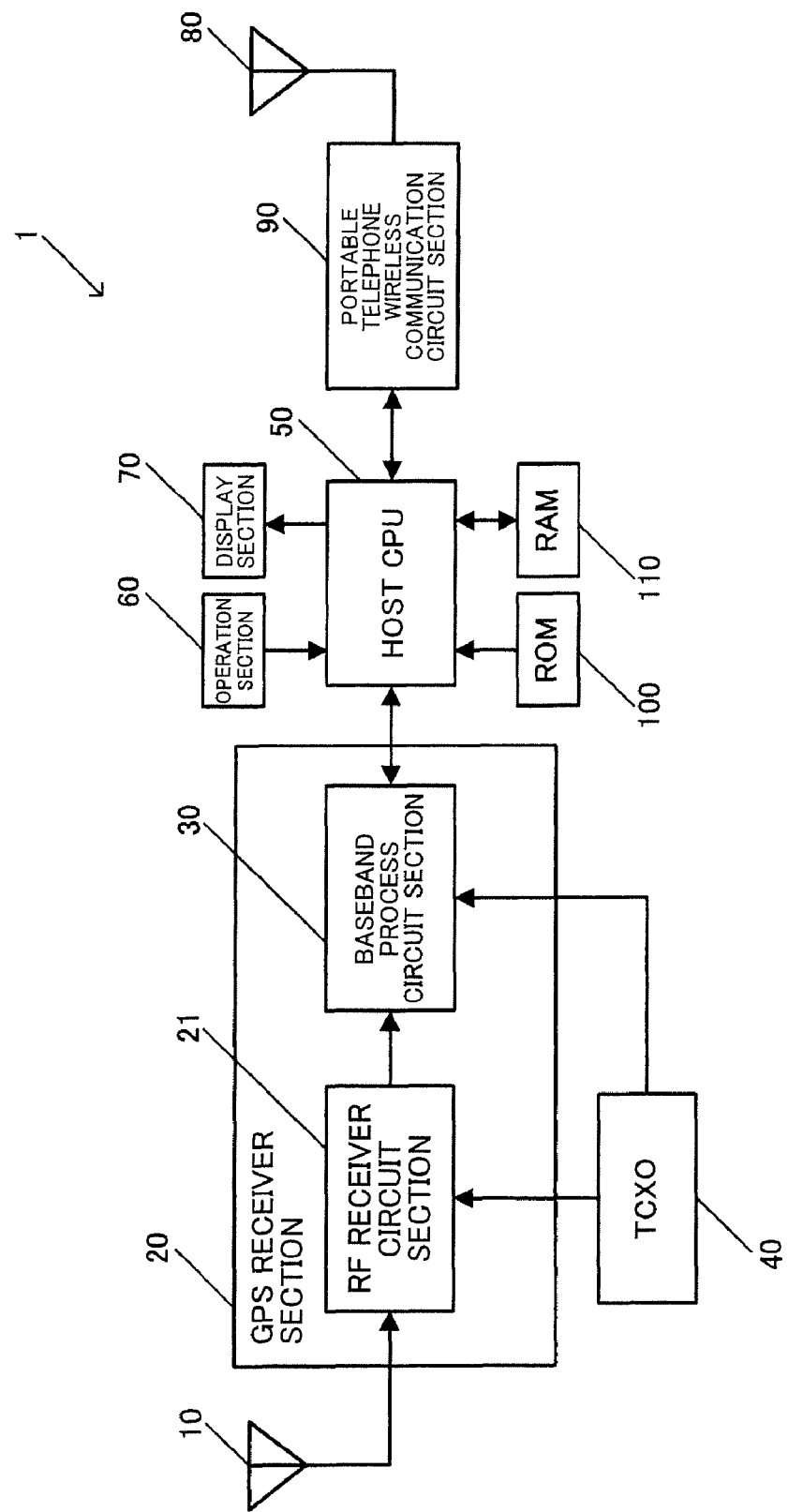
FIG. 1 is a block diagram showing the functional configuration of a portable telephone.

When using the technology disclosed in JP-A-2003-98244, it is necessary to calculate the difference in Doppler frequency corresponding to all of satellite combinations in order to detect cross-correlation. Therefore, when the number of acquisition target satellites is large, the amount of calculations increases. The technology disclosed in JP-A-2003-98244 is developed on the assumption that the positioning device is located in an environment in which the positioning device can receive a strong signal. Therefore, the technology disclosed in JP-A-2003-98244 cannot be directly applied to the case where the positioning device is located in an environment in which the positioning device can receive only a weak signal. Several embodiments of the invention may provide a received signal determination method that solves the above-mentioned problems.

According to one embodiment of the invention, there is provided a method comprising:

receiving a positioning signal;

performing correlation calculations on the received positioning signal using a code replica of one spreading code among the plurality of spreading codes;

selecting a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;

changing a threshold value condition for the total peak value based on the remote peak value; and determining whether or not the received positioning signal is spread-modulated with the one spreading code by determining whether or not the total peak value satisfies the threshold value condition.

According to another embodiment of the invention, there is provided a positioning device comprising:

a receiver section that receives a positioning signal;

a correlation calculation section that performs correlation calculations on the received positioning signal using a code replica of one spreading code among the plurality of spreading codes;

a selection section that selects a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;

a threshold value condition change section that changes a threshold value condition for the total peak value based on the remote peak value;

a signal determination section that determines whether or not the received positioning signal is spread-modulated with the one spreading code by determining whether or not the total peak value satisfies the threshold value condition; and a positioning section that calculates a position using the determined positioning signal by the signal determination section.

According to the above configuration, correlation calculations using the code replica of one spreading code among the plurality of spreading codes are performed on the received positioning signal while shifting the phase of the code replica. The total peak value and the remote peak value are selected from the correlation values obtained by correlation calculations, and the threshold value condition for the total peak value used to determine whether or not the received positioning signal is a positioning satellite signal that is spread-modulated with one spreading code is changed based on the remote peak value. Whether or not the received positioning signal is a positioning satellite signal that is spread-modulated with one spreading code is determined by determining whether or not the total peak value satisfies the threshold value condition.

Cross-correlation can be appropriately detected without increasing the amount of calculations by utilizing a simple method that selects the maximum correlation value among the correlation values apart from the total peak value by one or more chips as the remote peak value and determines whether or not the total peak value satisfies the threshold value condition that is variably set based on the remote peak value. As a result, the positioning accuracy can be improved.

In the method, the spreading code may include N chips;

the performing of the correlation calculations may include dividing the spreading code into M ($\geq$N) cells, and may perform the correlation calculations while shifting a phase in cell units; and a third maximum correlation value among correlation values corresponding to cells that are included in the M cells and apart from the phase of the total peak value by M/N or more cells being selected as the remote peak value.

In the positioning device, the spreading code may include N chips;

the correlation calculation section may divide the spreading code into M ($\geq$N) cells, and may perform the correlation calculations while shifting a phase in cell units; and the selection section may select a maximum correlation value among correlation values corresponding to cells that are included in the M cells and apart from the phase of the total peak value by M/N or more cells as the remote peak value.

According to the above configuration, the spreading code that includes N chips is divided into M ($\geq$N) cells, and correlation calculations are performed while shifting the phase in cell units. The maximum correlation value among the correlation values corresponding to the cells apart from the phase of the total peak value by M/N or more cells is selected as the remote peak value. Therefore, correlation calculations are performed minutely in cell units. On the other hand, the remote peak value is not selected from the correlation values corresponding to the cells included in the same chip as the cell corresponding to the total peak value.

In the method, the performing of the correlation calculations may include integrating correlation values while changing an integration time;

the method may further comprise:

determining a type of the remote peak value with respect to the integration time when performing the correlation calculations from a plurality of types that are defined in advance as types of change in correlation value corresponding to the integration time during the correlation calculations; wherein the changing of the threshold value condition may include changing the threshold value condition using a threshold value condition change policy corresponding to the determined type among a plurality of threshold value condition change policies defined in advance corresponding to the plurality of types.

In the positioning device, the correlation calculation section may integrate calculated correlation values while changing an integration time;

the positioning device may further comprise:

a correlation value type determination section that determines a type of the remote peak value with respect to the integration time during the correlation calculations performed by the correlation calculation section from a plurality of types that are defined in advance as types of change in correlation value corresponding to the integration time during the correlation calculations; wherein the threshold value condition change section may change the threshold value condition using a threshold value condition change policy corresponding to the type determined by the correlation value type determination section among a plurality of threshold value condition change policies defined in advance corresponding to the plurality of types.

According to the above configuration, the type of the remote peak value with respect to the integration time when performing the correlation calculations is determined from the plurality of types that are defined in advance as the types of change in correlation value corresponding to the integration time during the correlation calculations. The threshold value condition is changed using the threshold value condition change method corresponding to the determined type among the plurality of threshold value condition change methods defined in advance corresponding to the plurality of types. The cross-correlation detection reliability can be improved by changing the threshold value condition corresponding to the type of change in correlation value.

In the method, the threshold value condition may be a condition relating to a relative threshold value of the total peak value with respect to the remote peak value;

each of the plurality of threshold value condition change policies may be defined by a function that calculates the relative threshold value and has at least the integration time and the remote peak value as variables;

the changing of the threshold value condition may include calculating the relative threshold value by substituting the integration time when performing the correlation calculations and the remote peak value for the variables of the function defined as the threshold value condition change policy corresponding to the determined type; and the method may further comprise:

determining that the received positioning signal is spread-modulated with the one spreading code when a relative value of the total peak value with respect to the remote peak value exceeds the calculated relative threshold value.

In the positioning device, the threshold value condition may be a condition relating to a relative threshold value of the total peak value with respect to the remote peak value;

each of the plurality of threshold value condition change policies may be defined by a function that calculates the relative threshold value and has at least the integration time and the remote peak value as variables;

the threshold value condition change section may calculate the relative threshold value by substituting the integration time when performing the correlation calculations and the remote peak value for the variables of the function defined as the threshold value condition change policy corresponding to the type determined by the correlation value type determination section; and the signal determination section may determine that the received positioning signal is spread-modulated with the one spreading code when a relative value of the total peak value with respect to the remote peak value exceeds the calculated relative threshold value.

According to the above configuration, the relative threshold value is calculated by substituting the integration time when performing the correlation calculations and the remote peak value for the variables of the function defined as the threshold value condition change method corresponding to the determined type. The received positioning signal is determined to be a positioning signal that is spread-modulated with one spreading code when the relative value of the total peak value with respect to the remote peak value exceeds the calculated relative threshold value.

In the method, the types of change in correlation value corresponding to the integration time during the correlation calculations may be classified into a first type and a second type, the first type representing a change in correlation value when the total peak value is a correlation value that indicates a signal, and the second type representing a change in correlation value when the total peak value is a correlation value that indicates noise; and the functions may be mathematical models that imitate an actual change in correlation value, the function corresponding to the first type being a linear function, and the function corresponding to the second type being a nonlinear function.

In the positioning device, the types of change in correlation value corresponding to the integration time during the correlation calculations may be classified into a first type and a second type, the first type representing a change in correlation value when the total peak value is a correlation value that indicates a signal, and the second type representing a change in correlation value when the total peak value is a correlation value that indicates noise; and the functions may be mathematical models that imitate an actual change in correlation value, the function corresponding to the first type being a linear function, and the function corresponding to the second type being a nonlinear function.

According to the above configuration, a linear function is associated with a change in correlation value when the total peak value is a correlation value that indicates a signal (first type), and a nonlinear function is associated with a change in correlation value when the total peak value is a correlation value that indicates noise (second type). Since these functions are mathematical models that imitate an actual change in correlation value, an appropriate threshold value corresponding to an actual change in correlation value can be calculated.

In the method, a lower limit of a signal-to-noise ratio (SNR) of a communication signal that is received when receiving the positioning signal may be equal to or lower than −150 dBm.

In the positioning device, a lower limit of a signal-to-noise ratio (SNR) of a communication signal that can be received by the receiver section may be equal to or lower than −150 dBm.

According to the above configuration, since the lower limit of the SNR of the communication signal that can be received is equal to or lower than −150 dBm, cross-correlation can be appropriately detected in a super-sensitive signal reception environment in which a weak signal can also be received.

According to another embodiment of the invention, there is provided an electronic instrument comprising the above positioning device.

Examples of preferred embodiments of the invention are described below with reference to the drawings. The following description is given taking a portable telephone as an example of an electronic instrument that includes a positioning device and the GPS as an example of a positioning system. Note that embodiments to which the invention may be applied are not limited thereto.

1. Functional Configuration

FIG. 1 is a block diagram showing the functional configuration of a portable telephone 1. The portable telephone 1 includes a GPS antenna 10, a GPS receiver section 20, a temperature-compensated crystal oscillator (TCXO) 40, a host central processing unit (CPU) 50, an operation section 60, a display section 70, a portable telephone antenna 80, a portable telephone wireless communication circuit section 90, a read-only memory (ROM) 100, and a random access memory (RAM) 110.

The GPS antenna 10 is an antenna that receives a radio frequency (RF) signal including a GPS satellite signal transmitted from a GPS satellite. The GPS antenna 10 outputs the received signal to the GPS receiver section 20. The GPS antenna 10 is a super-sensitive antenna that can receive a GPS satellite signal having a signal-to-noise ratio (SNR) equal to or lower than −150 dBm. The GPS satellite signal is a 1.57542-GHz communication signal that is directly spreadspectrum-modulated with a PRN code (i.e., a spreading code that differs corresponding to each satellite). The PRN code is a pseudo random noise (PRN) having a code length of 1023 chips and a cycle of 1 ms.

The GPS receiver section 20 is a positioning device that locates the current position of the portable telephone 1 based on the signal output from the GPS antenna 10. The GPS receiver section 20 is a functional block corresponding to a GPS receiver. The GPS receiver section 20 includes an RF receiver circuit section 21 and a baseband process circuit section 30. The RF receiver circuit section 21 and the baseband process circuit section 30 may be produced as different large scale integrated (LSI) circuits, or may be incorporated in one chip. The GPS receiver section 20 is a super-sensitive GPS system. The GPS receiver section 20 can receive a signal having an SNR of at least about −150 dBm (lower limit). The GPS receiver section 20 may be a system that can receive a signal having an SNR of about −150 dBm less.

The RF receiver circuit section 21 is a high-frequency signal (RF signal) circuit block. The RF receiver circuit section 21 generates an RF signal multiplication oscillation signal by dividing or multiplying the frequency of the oscillation signal generated by the TCXO 40. The RF receiver circuit section 21 down-converts the RF signal into an intermediate-frequency signal (hereinafter referred to as "IF signal") by multiplying the RF signal output from the GPS antenna 10 by the generated oscillation signal, subjects the IF signal to amplification and the like, converts the resulting signal into a digital signal using an A/D converter, and outputs the resulting digital signal to the baseband process circuit section 30.

The baseband process circuit section 30 is a positioning circuit that acquires/extracts the GPS satellite signal by performing a correlation process and the like on the IF signal output from the RF receiver circuit section 21, decodes the data contained in the GPS satellite signal to extract a navigation message, time information, and the like, and performs positioning calculations.

Figure 2:
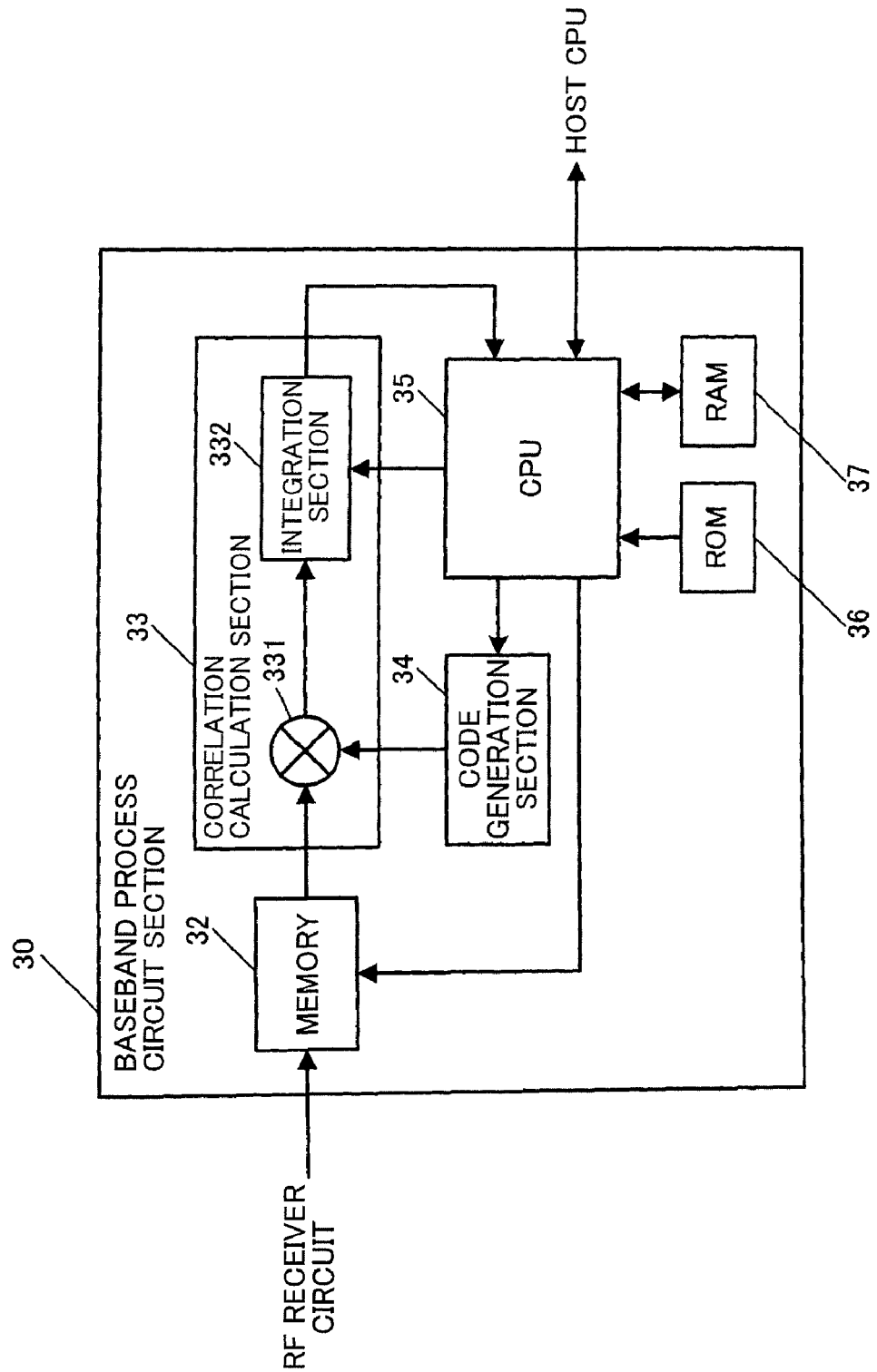
FIG. 2 is a block diagram showing the circuit configuration of a baseband process circuit section.

FIG. 2 is a view showing an example of the circuit configuration of the baseband process circuit section 30. The baseband process circuit section 30 includes a memory 32, a correlation calculation section 33, a code generation section 34, a CPU 35, a ROM 36, and a RAM 37.

The memory 32 samples and stores the IF signal input from the RF receiver circuit section 21 at given time intervals based on a control signal from the CPU 35.

The correlation calculation section 33 includes a mixer 331 and an integration section 332. The correlation calculation section 33 performs a coherent integration process that calculates the correlation between the IF signal sampling data stored in the memory 32 and a code replica input from the code generation section 34 using FFT calculations or the like, and performs an incoherent integration process that integrates the correlation values obtained by the coherent integration process over a given integration time T (e.g., one second) to calculate an integrated correlation value P.

In this case, the correlation calculation section 33 divides the 1023-chip PRN code into a given number C of cells, and performs correlation calculations while shifting the phase in cell units. In this embodiment, the number C of cells is set at 2000 that is about twice as many as 1023 (i.e., the number of chips of the PRN code). Therefore, adjacent cells may be included in a single chip. On the other hand, cells apart from each other by two or more cells are necessarily included in different chips. Specifically, the PRN code (spreading code) includes N chips. The PRN code is divided into M cells. Therefore, cells apart from each other by M/N or more cells are not included in a single chip.

The mixer 331 multiplies the IF signal sampling data stored in the memory 32 by the code replica input from the code generation section 34 to calculate the correlation value, and outputs the calculated correlation value to the integration section 332.

The integration section 332 integrates the correlation values input from the mixer 331 over the integration time T to calculate the integrated correlation value P, and outputs the integrated correlation value P to the CPU 35 each time the integration time T has elapsed. Since the value that can be stored is limited from the viewpoint of circuitry (memory capacity), the integration section 332 can integrate the correlation values input from the mixer 331 as long as the integrated correlation value P does not exceed the integration limit value. In this embodiment, the CPU 35 controls the integration process of the integration section 332 so that the integrated correlation value P does not exceed the integration limit value.

Specifically, the CPU 35 always monitors the integrated correlation value P integrated by the integration section 332, and adjusts the amount of integration stepwise each time the integrated correlation value P approaches the integration limit value. Specifically, the CPU 35 halves the stored integrated value and the correlation value to be added in the first stage, and further halves the stored integrated value and the correlation value to be added in the second stage. Specifically, the CPU 35 shifts the number of bits of the stored integrated value and the number of bits of the correlation value to be added to adjust the significant digits (significant digits in two-bit representation). The CPU 35 determines whether or not the integrated correlation value P has approached the integration limit value by determining whether or not the number of bits of the stored integrated correlation value has reached a given number of bits. In the following description, a parameter S used to adjust the amount of integration is referred to as "power scale".

The code generation section 34 generates a code replica that imitates the PRN code of the acquisition target GPS satellite based on the control signal from the CPU 35, and outputs the generated code replica to the mixer 331.

The CPU 35 is a processor that performs positioning calculations to calculate the current position of the portable telephone 1. Specifically, the CPU 35 detects the phases of the PRN code and the carrier frequency included in the GPS satellite signal based on the integrated correlation value P output from the correlation calculation section 33 to acquire/track the GPS satellite signal. The CPU 35 extracts the navigation message by decoding the data included in the acquired/tracked GPS satellite signal, and performs pseudo-range calculations, positioning calculations, and the like based on the GPS satellite orbit information, time information, and the like included in the navigation message to calculate the current position of the portable telephone 1.

In this embodiment, the CPU 35 performs current position positioning calculations. Note that the host CPU 50 may perform some or all of the processes performed by the CPU 35.

If the acquisition target GPS satellite signal is correct, the PRN code included in the GPS satellite signal coincides with the code replica (success). If the acquisition target GPS satellite signal is incorrect, the PRN code included in the GPS satellite signal does not coincide with the code replica (failure). Therefore, whether or not the GPS satellite signal has been acquired successfully can be determined by determining the peak of the calculated integrated correlation value P. The GPS satellite signal can be acquired by performing correlation calculations on the received signal while changing the code replica.

In this embodiment, the CPU 35 determines whether or not the GPS satellite signal (GPS satellite) has been acquired successfully according to the following process. Specifically, the CPU 35 selects a total peak cell $C_T$ (i.e., a cell corresponding to the maximum integrated correlation value P among the integrated correlation values corresponding to the cells obtained by causing the correlation calculation section 33 to perform correlation calculations while shifting the phase in cell units) and a total peak value $P_T$ (i.e., the integrated correlation value corresponding to the total peak cell $C_T$).

The CPU 35 also selects a remote peak cell $C_F$ (i.e., a cell corresponding to the maximum integrated correlation value P among the cells apart from the total peak cell $C_T$ by two or more cells) and a remote peak value $P_F$ (i.e., the integrated correlation value corresponding to the remote peak cell). The remote peak cell $C_F$ is selected from the cells apart from the total peak cell $C_T$ by two or more cells because two adjacent cells may be included in a single chip.

The CPU 35 then determines a remote peak level corresponding to the remote peak value $P_F$ from eight-stage remote peak levels based on the selected remote peak value $P_F$ and the integration time T. The eight-stage remote peak levels are defined in advance as types of change in correlation value. The CPU 35 variably sets a threshold value $P_\theta$ of the total peak value $P_T$ based on the determined remote peak level.

When the total peak value $P_T$ has exceeded the threshold value $P_\theta$ ($P_T > P_\theta$), the CPU 35 determines that the PRN code of the acquisition target GPS satellite signal coincides with the code replica (i.e., the GPS satellite signal has been acquired successfully). When the total peak value $P_T$ is equal to or smaller than the threshold value $P_\theta$ ($P_T \leq P_\theta$), the CPU 35 determines that the PRN code of the acquisition target GPS satellite signal does not coincide with the code replica (i.e., the GPS satellite signal has not been acquired successfully).

Figure 3:
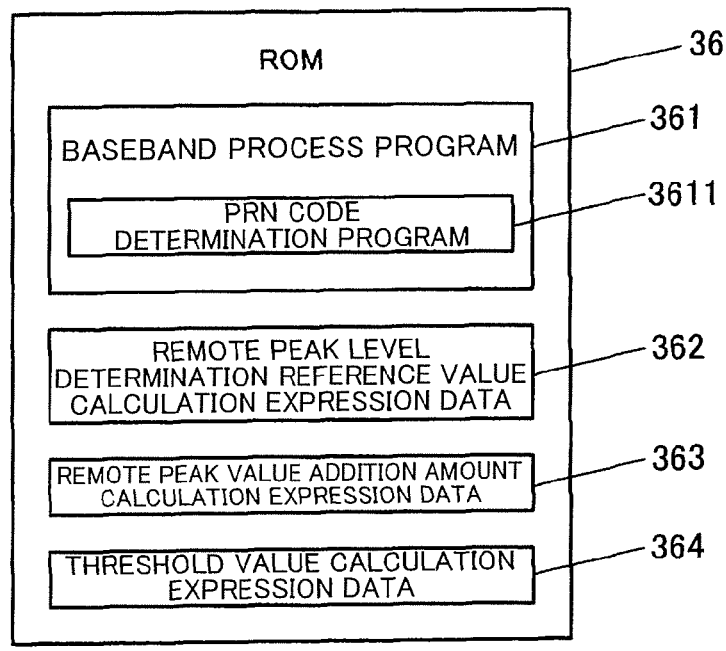
FIG. 3 is a view showing an example of data stored in a ROM.

FIG. 3 is a view showing an example of data stored in the ROM 36. The ROM 36 stores a baseband process program 361 that is read by the CPU 35 and executed as a baseband process (see FIG. 16), remote peak level determination reference value calculation expression data 362, remote peak value addition amount calculation expression data 363, and threshold value calculation expression data 364. The baseband process program 361 includes a PRN code determination program 3611 (executed as a PRN code determination process (see FIG. 17)) as a subroutine.

In the baseband process, the CPU 35 determines whether or not the PRN code of each acquisition target GPS satellite (hereinafter referred to as "acquisition target satellite") coincides with the code replica to determine whether or not the acquisition target satellite has been acquired successfully, and calculates the current position of the portable telephone 1 based on the GPS satellite signal transmitted from the GPS satellite that has been acquired successfully (hereinafter referred to as "acquired satellite"). The details of the baseband process are described later using a flowchart.

In the PRN code determination process, the CPU 35 selects the total peak value $P_T$ and the remote peak value $P_F$ from the integrated correlation values P input from the correlation calculation section 33, and variably sets the threshold value $P_\theta$ of the total peak value $P_T$ based on the remote peak level of the selected remote peak value $P_F$. When the total peak value $P_T$ has exceeded the set threshold value $P_\theta$, the CPU 35 determines that the PRN code of the GPS satellite signal transmitted from the acquisition target satellite coincides with the code replica and the received signal is the GPS satellite signal transmitted from the acquisition target satellite (i.e., the acquisition target satellite has been acquired successfully). The details of the PRN code determination process are described later using a flowchart.

Figure 5:
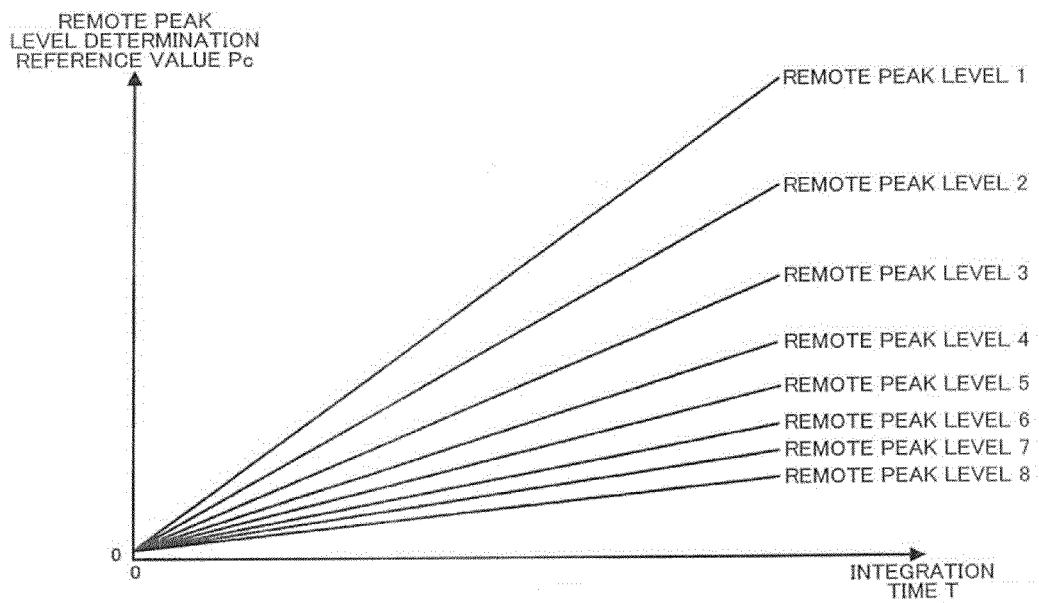
FIG. 5 is a view illustrative of the details of remote peak level determination reference value calculation expression data.

FIG. 5 is a view illustrative of the details of the remote peak level determination reference value calculation expression data 362. FIG. 5 shows a graph in which the horizontal axis indicates the integration time T and the vertical axis indicates a remote peak level determination reference value $P_C$. Calculation expression data used to calculate the remote peak level determination reference value $P_C$ corresponding to each of remote peak levels "1" to "8" is stored as the remote peak level determination reference value calculation expression data 362.

Figure 6:
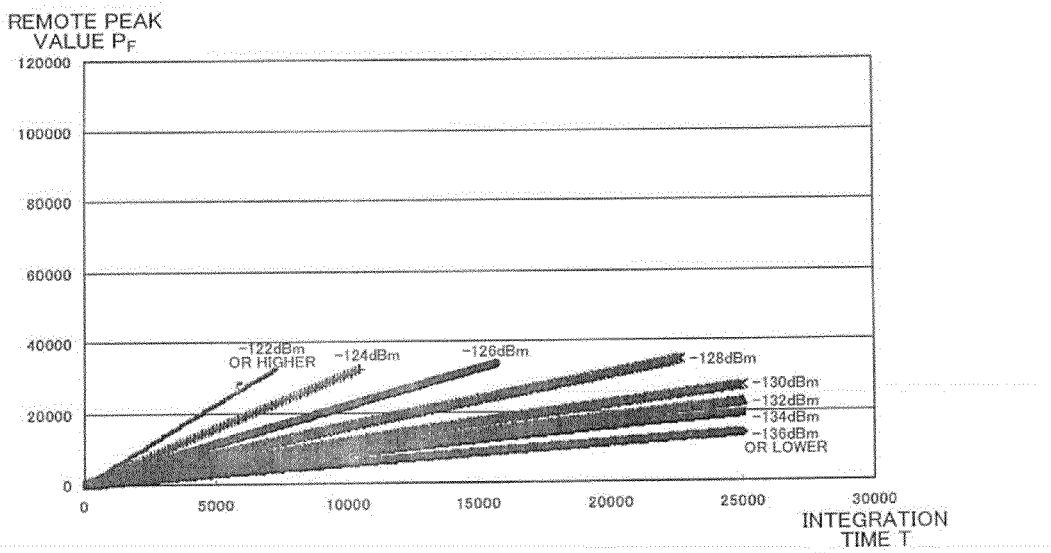
FIG. 6 is a view showing experimental results for deriving a remote peak level determination reference value calculation expression.

The remote peak level determination reference value $P_{Cn}$ (n is the remote peak level) of the remote peak level n is given by the following expression (1) that is a linear function having the integration time T as a variable.

$$P_{Cn} = k_{1n} \times T + k_{2n} \quad (1)$$

where, $k_{1n}$ and $k_{2n}$ are coefficients determined in advance based on measurement results shown in FIG. 6. The coefficient $k_{1n}$ that indicates the slope of the function increases as the remote peak level decreases.

The calculation expression for the remote peak level determination reference value $P_C$ is a mathematical model that represents the measurement results for the remote peak value $P_F$ corresponding to the SNR when performing correlation calculations on the PRN code of the GPS satellite signal and the code replica while changing the SNR of the GPS satellite signal.

FIG. 6 is a view showing an example of the measurement results for the remote peak value $P_F$. FIG. 6 shows a graph in which the horizontal axis indicates the integration time T and the vertical axis indicates the remote peak value $P_F$. FIG. 6 shows a change in the remote peak value $P_F$ corresponding to the SNR when changing the SNR of the acquisition target GPS satellite signal from −122 dBm to −136 dBm by 2 dBm. The results indicate that the remote peak value $P_F$ linearly increases as the integration time T increases irrespective of the SNR.

The calculation expression (expression (1)) for the remote peak level determination reference value $P_C$ is an expression that approximates each of the remote peak levels "1" to "8" using a linear function of the integration time T while associating the remote peak levels "1" to "8" with the SNR of the GPS satellite signal in descending order based on the results shown in FIG. 6. Note that the remote peak level is determined to be "1" when the SNR is equal to or higher than −122 dBm, and the remote peak level is determined to be "8" when the SNR is equal to or lower than −136 dBm. The remote peak level "8" is a noise level.

The CPU 35 calculates the remote peak level determination reference value $P_C$ corresponding to each remote peak level according to the expression (1) using the selected remote peak value $P_F$ and the integration time T. The CPU 35 compares the reference value of each remote peak level with the remote peak value $P_F$ to specify the remote peak level determination reference value $P_C$ that is closest to the remote peak value $P_F$ and determine its remote peak level.

Figure 7:
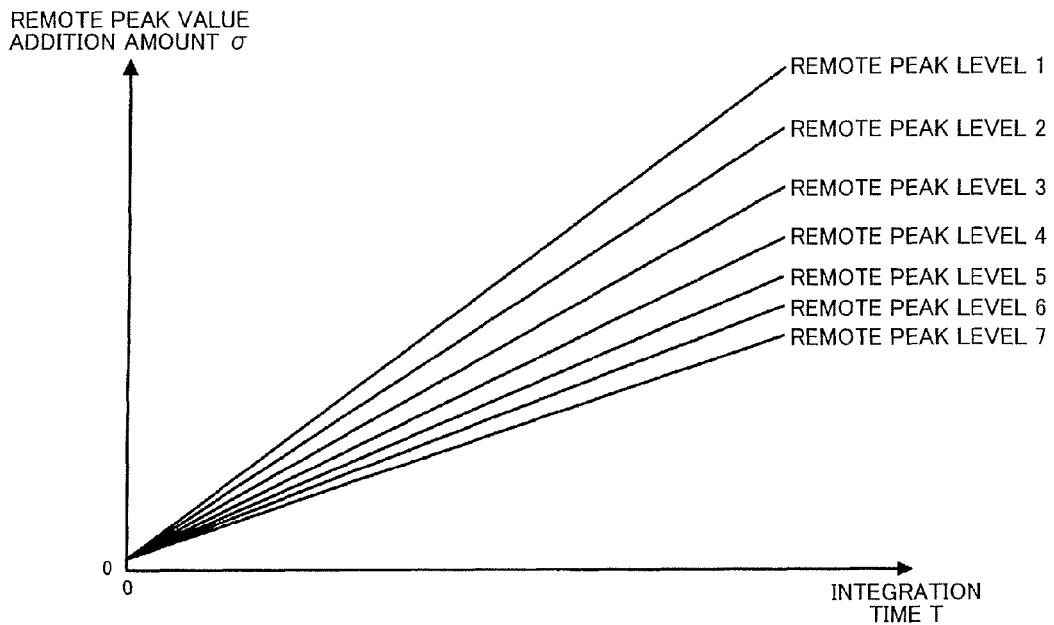
FIG. 7 is a view illustrative of the details of remote peak value addition amount calculation expression data.
Figure 8:
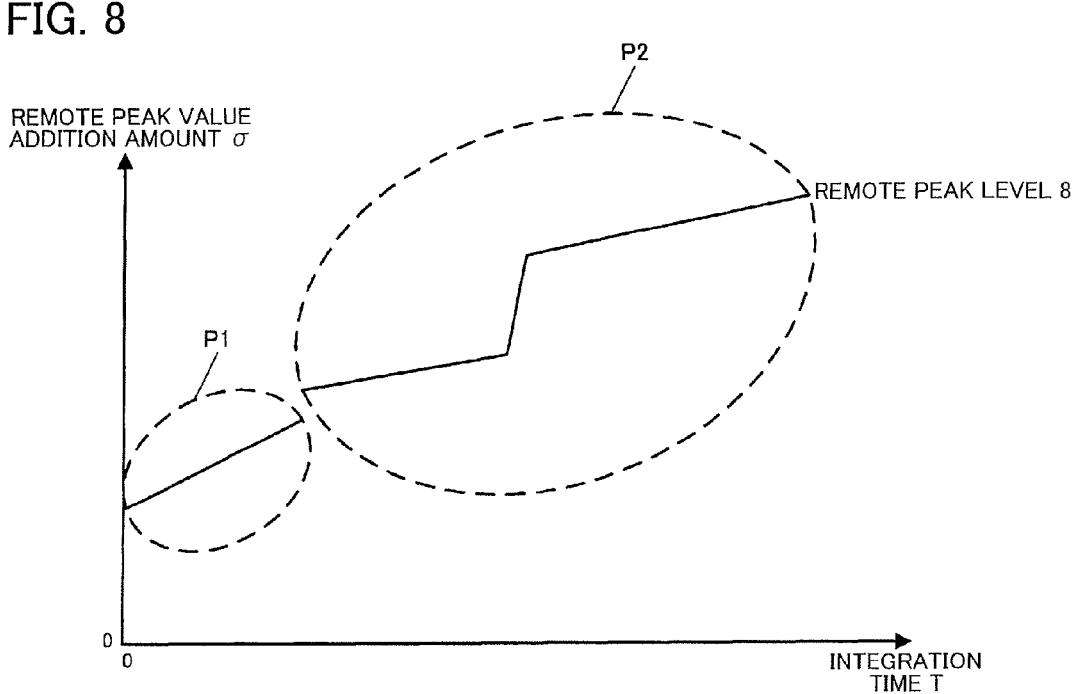
FIG. 8 is a view illustrative of the details of remote peak value addition amount calculation expression data.

FIGS. 7 and 8 are views illustrative of the details of the remote peak value addition amount calculation expression data 363. FIGS. 7 and 8 show graphs in which the horizontal axis indicates the integration time T and the vertical axis indicates a remote peak value addition amount σ. Calculation expression data used to calculate the remote peak value addition amount σ corresponding to each of the remote peak levels "1" to "8" is stored as the remote peak value addition amount calculation expression data 363.

FIG. 7 shows a calculation expression graph used to calculate the remote peak value addition amount σ when the remote peak level is "1" to "7". The remote peak value addition amount $\sigma_n$ of the remote peak level n is given by the following expression (2) that is a linear function having the integration time T and the remote peak value P" as variables.

$$\sigma_n = u_{1n} \times T + u_{2n} \times P_F + u_{3n} \quad (2)$$

where, $u_{1n}$ and $u_{2n}$ are coefficients determined in advance to simulate measurement results described later with reference to FIG. 9. The coefficients $u_{1n}$ and $u_{2n}$ that indicate the slope of the function increase as the remote peak level decreases.

FIG. 8 shows a graph of the calculation expression used to calculate the remote peak value addition amount 6 when the remote peak level is "8". The remote peak value addition amount σ is approximated using one of two functions that differ in characteristics corresponding to the power scale S.

Specifically, when the power scale S is smaller than four (S<4), the remote peak value addition amount σ is given by the following expression (3).

$$\sigma = v_1 \times T + v_2 \times P_F + v_3 \times S + v_4 \quad (3)$$

When the power scale S is equal to or larger than four (S≧4), the remote peak value addition amount σ is given by the following expression (4).

$$\sigma = w_1 \times T + w_2 \times PF + w_3 \times 2^S + w_4 \quad (4)$$

Note that the coefficients $v_1$, $v_2$, $v_3$, and $v_4$ in the expression (3) and the coefficients $w_1$, $w_2$, $w_3$, and $w_4$ in the expression (4) are determined to simulate the measurement results described with reference to FIGS. 9 and 10.

The expression (3) and the expression (4) differ in that the expression (3) is a linear function having the integration time T, the remote peak value $P_F$, and the power scale S as variables and the expression (4) is a nonlinear function since the third term of the right side is $2^S$.

The calculation expression for the remote peak value addition amount 6 is a mathematical model that simulates the measurement results for the remote peak value addition amount 6 corresponding to the SNR when performing correlation calculations on the PRN code of the GPS satellite signal and the code replica while changing the SNR of the GPS satellite signal.

Figure 9:
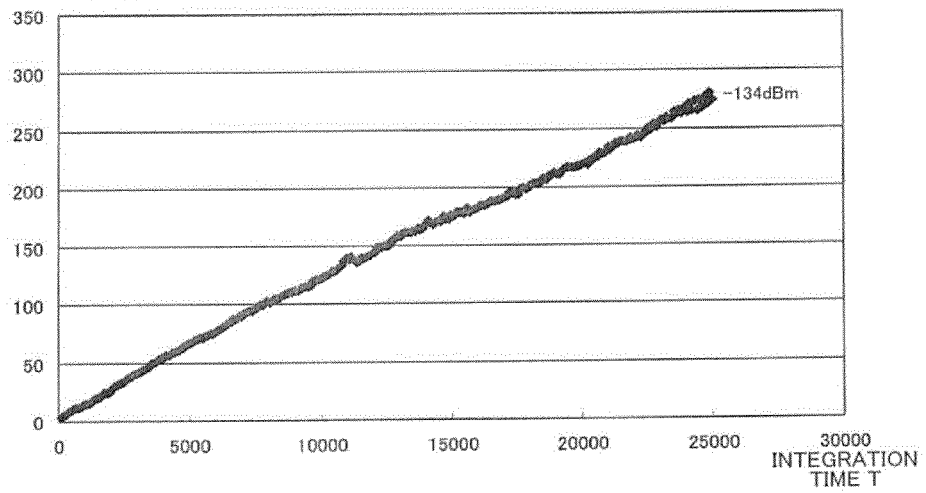
FIG. 9 is a view showing experimental results for deriving a remote peak value addition amount calculation expression.
Figure 10:
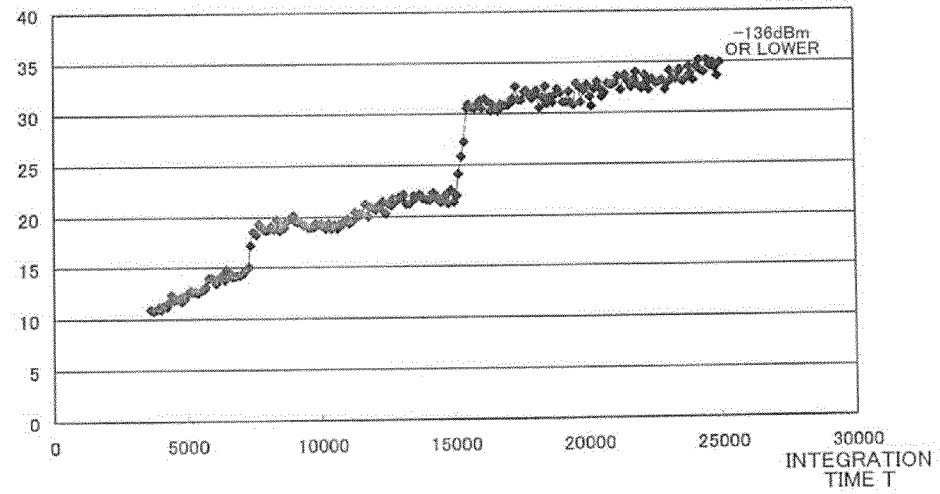
FIG. 10 is a view showing experimental results for deriving a remote peak value addition amount calculation expression.

FIGS. 9 and 10 are views showing examples of the measurement results for the remote peak value addition amount σ. FIG. 9 shows an example of the measurement results when the SNR of the GPS satellite signal is −134 dBm (=remote peak level "7"), and FIG. 10 shows an example of the measurement results when the SNR of the GPS satellite signal is equal to or lower than −136 dBm (=remote peak level "8"). In FIGS. 9 and 10, the horizontal axis indicates the integration time T, and the vertical axis indicates the remote peak value addition amount σ.

When the SNR of the GPS satellite signal is −134 dBm, the remote peak value addition amount σ linearly increases as the integration time T increases. The expression (2) approximates the remote peak value addition amount σ based on the results shown in FIG. 9 using a linear function having the integration time T and the remote peak value $P_F$ as variables.

Note that similar experimental results (not shown) were obtained when the SNR of the GPS satellite signal was higher than −134 dBm (i.e., when the remote peak level is "1" to "6"). It was found that the remote peak value addition amount σ with respect to an identical integration time T increases as the SNR of the GPS satellite signal increases (i.e., as the remote peak level decreases). The calculation expression for the remote peak value addition amount σ is defined to coincide with the experimental results. In FIG. 7, the slope of the linear function increases as the remote peak level decreases.

When the SNR of the GPS satellite signal is equal to or lower than −136 dBm, the remote peak value addition amount σ increases as the integration time T increases, but does not show linear characteristics (see FIG. 10). The expressions (3) and (4) approximate the remote peak value addition amount σ using a linear function or a nonlinear function corresponding to the power scale S. Specifically, the expression (3) is an approximate expression corresponding to a section P1 enclosed by a broken line in FIG. 8, and the expression (4) is an approximate expression corresponding to a section P2 enclosed by a broken line in FIG. 8. More specifically, the expression (3) and (4) are a policy to change the threshold value condition defined in advance corresponding to the types of change in correlation value.

A calculation expression used to calculate the threshold value $P_\theta$ of the total peak value $P_T$ is stored as the threshold value calculation expression data 364. The threshold value $P_\theta$ is calculated by the following expression (5).

$$P_\theta = P_F + m \times \sigma \quad (5)$$

where, m is a constant that adjusts the remote peak value addition amount σ.

Figure 11:
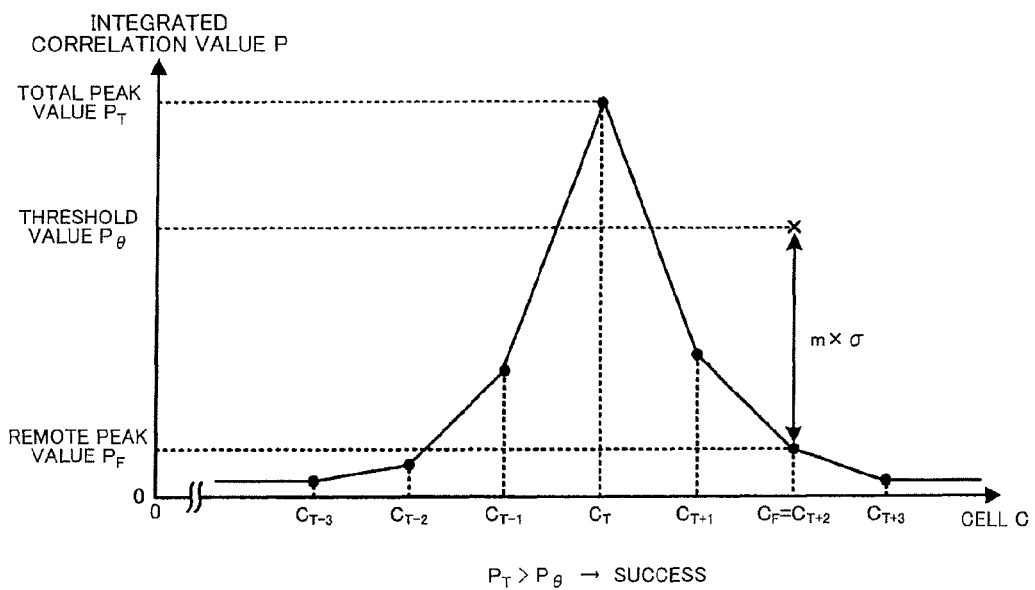
FIG. 11 shows an example of a change in integrated correlation value when cross-correlation has not occurred.

FIG. 11 shows an example of a change in the integrated correlation value P when cross-correlation has not occurred. In FIG. 11, the total peak value $P_T$ is larger than the threshold value $P_\theta$ obtained by adding m×σ to the remote peak value $P_F$ ($P_T > P_\theta$). In this case, the CPU 35 determines that the PRN code of the GPS satellite signal transmitted from the acquisition target satellite coincides with the code replica and the received signal includes the GPS satellite signal transmitted from the acquisition target satellite (i.e., the acquisition target satellite has been acquired successfully).

Figure 12:
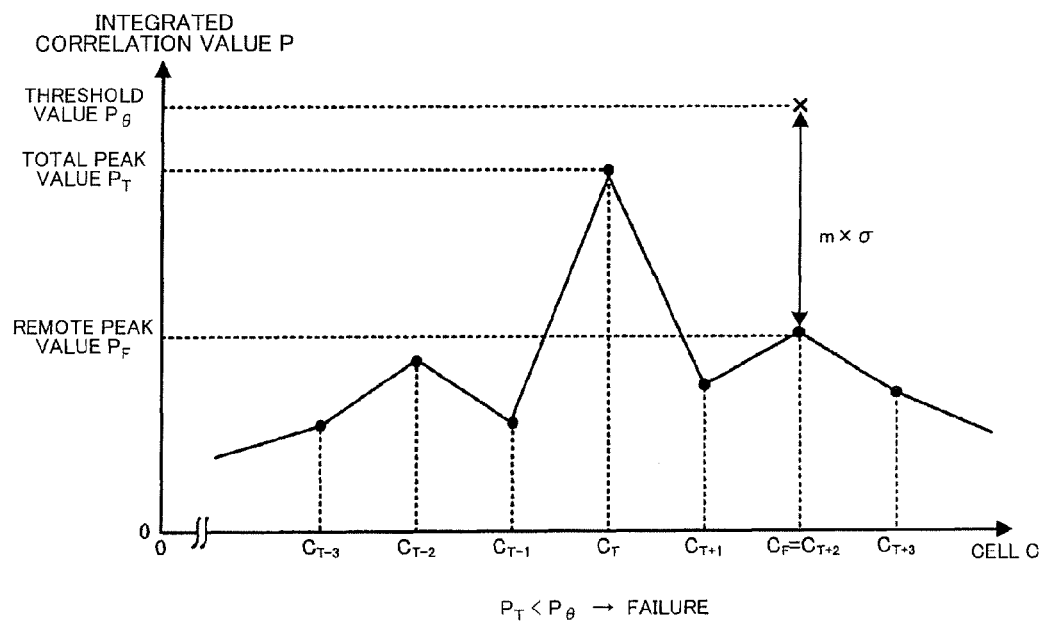
FIG. 12 shows an example of a change in integrated correlation value when cross-correlation has occurred.

FIG. 12 shows an example of a change in the integrated correlation value P when cross-correlation has occurred. In FIG. 12, the threshold value $P_\theta$ is larger than the total peak value $P_T$ ($P_T < P_\theta$). In this case, the CPU 35 determines that the PRN code of the GPS satellite signal transmitted from the acquisition target satellite does not coincide with the code replica and the received signal does not include the GPS satellite signal transmitted from the acquisition target satellite (i.e., the acquisition target satellite has not been acquired successfully).

Figure 4:
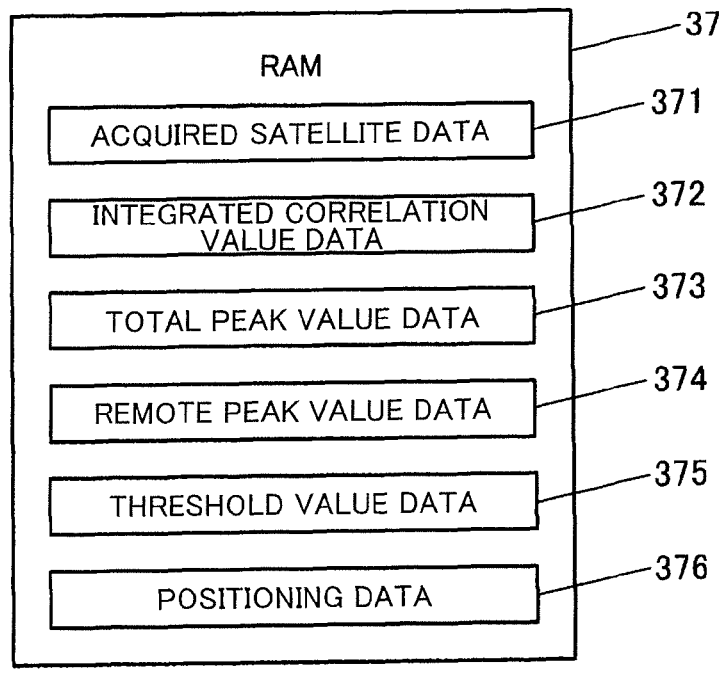
FIG. 4 is a view showing an example of data stored in a RAM.

FIG. 4 is a view showing an example of data stored in the RAM 37. The RAM 37 stores acquired satellite data 371, integrated correlation value data 372, total peak value data 373, remote peak value data 374, threshold value data 375, and positioning data 376.

The number of the acquired satellite is stored as the acquired satellite data 371. The acquired satellite data 371 is updated by the CPU 35 during the baseband process.

Figure 13:
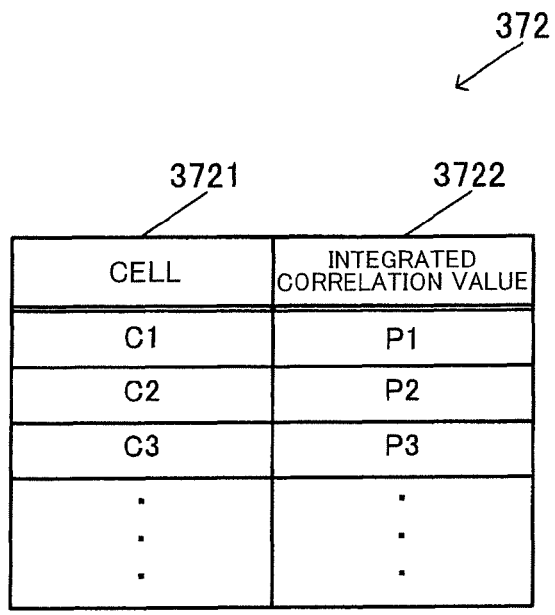
FIG. 13 is a view showing a data configuration example of integrated correlation value data.

FIG. 13 is a view showing a data configuration example of the integrated correlation value data 372. An integrated correlation value 3722 is stored as the integrated correlation value data 372 corresponding to each cell 3721. For example, the integrated correlation value corresponding to a cell C1 is P1. The CPU 35 updates the integrated correlation value data 372 by inputting the integrated correlation value P from the correlation calculation section 33.

Figure 14:
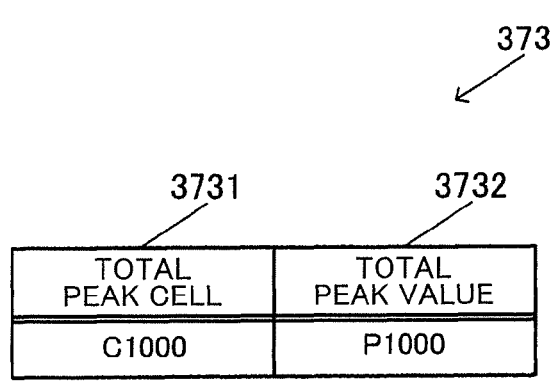
FIG. 14 is a view showing a data configuration example of total peak value data.

FIG. 14 is a view showing a data configuration example of the total peak value data 373. A total peak cell 3731 and a total peak value 3732 are stored as the total peak value data 373 while being associated with each other. In FIG. 14, the total peak cell is C1000, and the total peak value is P1000. The total peak value data 373 is updated by the CPU 35 during the PRN code determination process.

Figure 15:
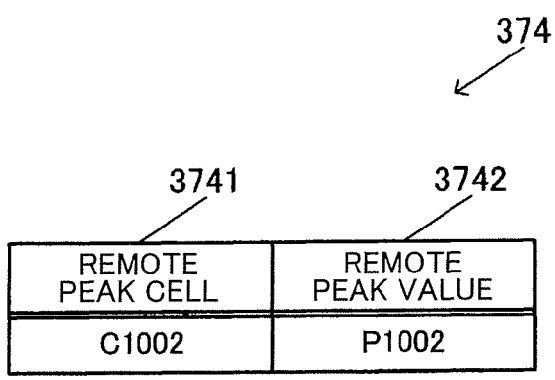
FIG. 15 is a view showing a data configuration example of remote peak value data.

FIG. 15 is a view showing a data configuration example of the remote peak value data 374. A remote peak cell 3741 and a remote peak value 3742 are stored as the remote peak value data 374 while being associated with each other. In FIG. 15, the remote peak cell is C1002, and the remote peak value is P1002. The remote peak value data 374 is updated by the CPU 35 during the PRN code determination process.

The threshold value $P_\theta$ of the total peak value $P_T$ calculated by the CPU 35 during the PRN code determination process is stored as the threshold value data 375. A located position located by the CPU 35 during the baseband process is stored as the positioning data 376.

The TCXO 40 is a temperature-compensated crystal oscillator that generates an oscillation signal at a given oscillation frequency. The TCXO 40 outputs the generated oscillation signal to the RF receiver circuit section 21 and the baseband process circuit section 30.

The host CPU 50 controls each section of the portable telephone 1 based on various programs such as a system program stored in the ROM 100. The host CPU 50 causes the display section 70 to display a navigation screen in which the located position input from the CPU 35 is plotted.

The operation section 60 is an input device that includes a touch panel, a button switch, and the like. The operation section 60 outputs a signal that indicates a key or a button that has been pressed to the host CPU 50. The user inputs various instructions such as a telephone call request or an e-mail send/receive request by operating the operation section 60.

The display section 70 is a display device that includes a liquid crystal display (LCD) or the like. The display section 70 displays various images based on a display signal input from the host CPU 50. The display section 70 displays a navigation screen, time information, and the like.

The portable telephone antenna 80 is an antenna that transmits and receives a portable telephone radio signal between the portable telephone 1 and a radio base station installed by a communication service provider of the portable telephone 1.

The portable telephone wireless communication circuit section 90 is a portable telephone communication circuit section that includes an RF conversion circuit, a baseband process circuit, and the like. The portable telephone wireless communication circuit section 70 implements a telephone call, e-mail transmission/reception, or the like by modulating/demodulating the portable telephone radio signal, for example.

The ROM 100 stores a system program that causes the host CPU 50 to control the portable telephone 1, a program and data necessary for implementing a navigation function, and the like.

The RAM 110 serves as a work area that temporarily stores the system program executed by the host CPU 50, various processing programs, data processed during various processes, processing results, and the like.

2. Process Flow

Figure 16:
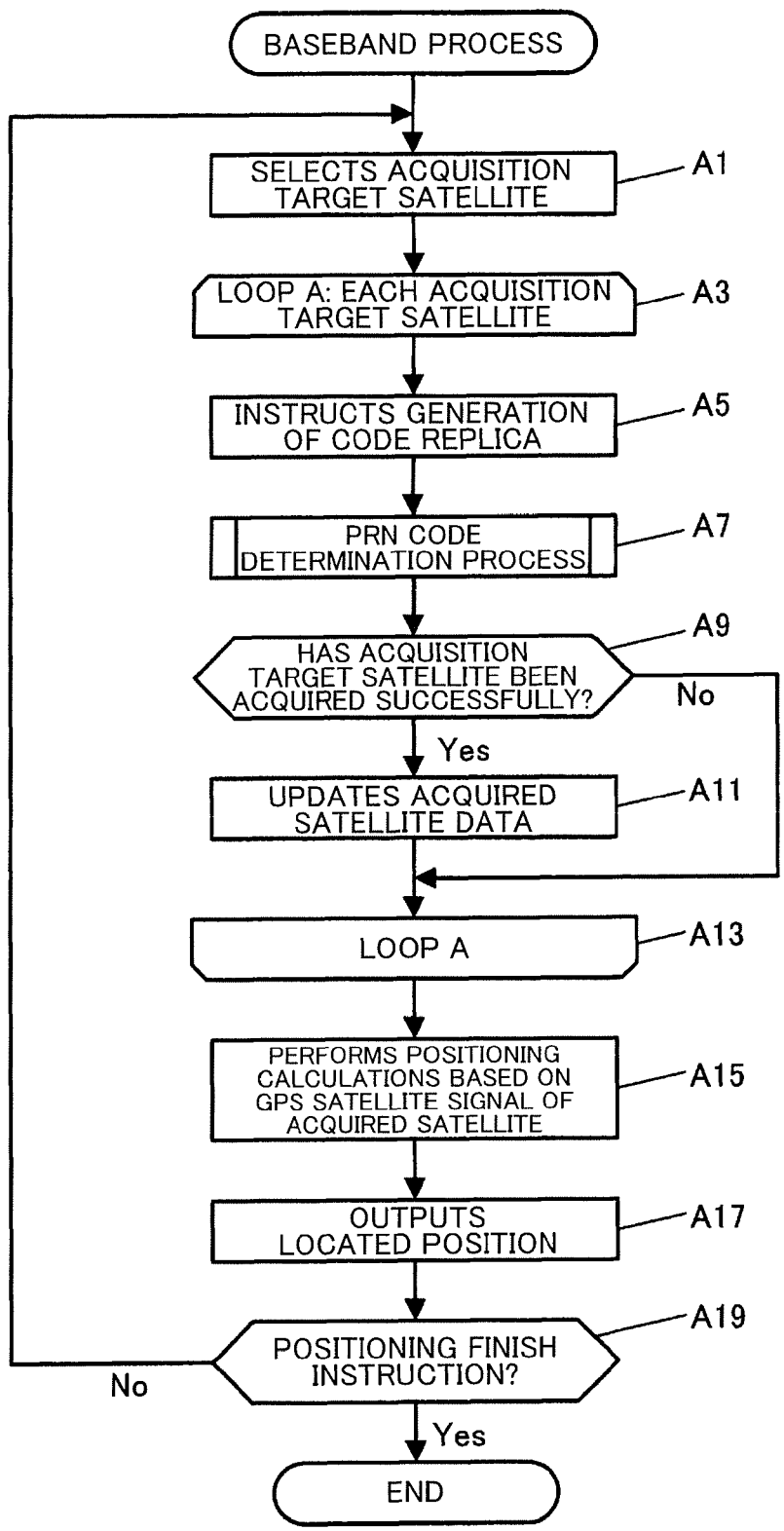
FIG. 16 is a flowchart showing the flow of a baseband process.

FIG. 16 is a flowchart showing the flow of the baseband process executed by the portable telephone 1 by causing the CPU 35 to read and execute the baseband process program 361 stored in the ROM 36.

The CPU 35 starts the baseband process when the RF receiver circuit section 21 has received the GPS satellite signal and the CPU 35 has detected that the user has performed a positioning start instruction operation using the operation section 60. The baseband process is performed in parallel with various processes such as executing various application programs. An operation that causes the portable telephone 1 to be turned ON/OFF may be associated with GPS startup/suspension, and the baseband process may be performed when an operation that causes the portable telephone 1 to be turned ON has been detected. In principle, positioning calculations are performed every second.

The CPU 35 executes the baseband process while the GPS antenna 10 receives the RF signal, the RF receiver circuit section 21 down-converts the RF signal into the IF signal, and the correlation calculation section 33 calculates the integrated correlation value P, for example.

The CPU 35 selects the acquisition target satellite based on the GPS satellite orbit information (e.g., almanac) (step A1). The CPU 35 executes a loop A process corresponding to each acquisition target satellite that has been selected (steps A3 to A13). In the loop A, the CPU 35 instructs the code generation section 34 to generate a code replica (step A5). The CPU 35 then executes the PRN code determination process by reading and executing the PRN code determination program 3611 stored in the ROM 36 (step A7).

FIG. 17 is a flowchart showing the flow of the PRN code determination process.

The CPU 35 selects the total peak cell $C_T$ and the total peak value $P_T$ from the integration results output from the correlation calculation section 33 and stored in the RAM 37 as the integrated correlation value data 372 (step B1), and stores the total peak cell $C_T$ and the total peak value $P_T$ in the RAM 37 as the total peak value data 373. The CPU 35 also selects the remote peak cell $C_F$ and the remote peak value $P_F$ (step B3), and stores the remote peak cell $C_F$ and the remote peak value $P_F$ as the remote peak value data 374.

The CPU 35 then determines the remote peak level based on the remote peak value $P_F$ selected in the step B3 and the integration time T (step B5). Specifically, the CPU 35 refers to the remote peak level determination reference value calculation expression data 362 stored in the ROM 36, and calculates the remote peak level determination reference value $P_C$ corresponding to each of the eight-stage remote peak levels according to the expression (1) using the integration time T. The CPU 35 determines the remote peak level corresponding to the remote peak level determination reference value $P_C$ closest to the remote peak value $P_F$ to be the remote peak level of the remote peak value $P_F$.

The CPU 35 then calculates the remote peak value addition amount σ based on the remote peak level determined in the step B5 by changing the threshold value condition change policy (calculation method) (step B7). Specifically, the CPU 35 refers to the remote peak value addition amount calculation expression data 363 stored in the ROM 36, and calculates the remote peak value addition amount σ according to the expression (2) when the remote peak level is "1" to "7". The CPU 35 calculates the remote peak value addition amount σ according to the expression (3) when the remote peak level is "8" and the power scale S is less than four (S<4), and calculates the remote peak value addition amount σ according to the expression (4) when the power scale S is equal to or larger than four (S≧4).

The CPU 35 then refers to the threshold value calculation expression data 364 stored in the ROM 36, and calculates the threshold value $P_\theta$ of the total peak value $P_T$ according to the expression (5) based on the remote peak value $P_F$ selected in the step B3 and the remote peak value addition amount 6 calculated in the step B7 (step B9).

The CPU 35 determines whether or not the total peak value $P_T$ selected in the step B1 is larger than the threshold value $P_\theta$ calculated in the step B9 (step B11). When the CPU 35 has determined that the total peak value $P_T$ is larger than the threshold value $P_\theta$ (step B11: Yes), the CPU 35 determines that the acquisition target satellite has been acquired successfully (step B13), and finishes the PRN code determination process. When the CPU 35 has determined that the total peak value $P_T$ is equal to or smaller than the threshold value $P_\theta$ (step B13: No), the CPU 35 determines that the acquisition target satellite has not been acquired successfully (step B15), and finishes the PRN code determination process.

Again referring to the baseband process shown in FIG. 16, when the CPU 35 has determined that the acquisition target satellite has not been acquired successfully (step A9: No), the CPU 35 processes the next acquisition target satellite. When the CPU 35 has determined that the acquisition target satellite has been acquired successfully (step A9: Yes), the CPU 35 adds the acquisition target satellite as the acquired satellite to update the acquired satellite data 371 stored in the RAM 37 (step A11), and processes the next acquisition target satellite.

After the CPU 35 has performed the process in the steps A5 to A11 on all of the acquisition target satellites, the CPU 35 finishes the loop A. The CPU 35 then performs positioning calculations using a least-square method or the like based on the GPS satellite signal transmitted from the acquired satellite stored as the acquired satellite data 371 (step A15), and stores the located position in the RAM 37 as the positioning data 376. The details of positioning calculations using the least-square method are known in the art. Therefore, description thereof is omitted.

The CPU 35 then outputs the located position determined by positioning calculations to the host CPU 50 (step A17). The CPU 35 then determines whether or not the user has issued a positioning finish instruction using the operation section 60 (step A19). When the CPU 35 has determined that the user has not issued the positioning finish instruction (step A19: No), the CPU 35 returns to the step A1. When the CPU 35 has determined that the user has issued the positioning finish instruction (step A19: Yes), the CPU 35 finishes the baseband process.

3. Effects

According to this embodiment, correlation calculations using the code replica of one of a plurality of PRN codes are performed on the received GPS satellite signal while shifting the phase (cell) of the code replica. The total peak value $P_T$ and the remote peak value $P_F$ are selected from the integrated correlation values P obtained by correlation calculations, and the threshold value $P_\theta$ of the total peak value $P_T$ used to determine whether or not the received GPS satellite signal is a GPS satellite signal that is spread-modulated with a PRN code is changed based on the remote peak value $P_F$. Whether or not the received GPS satellite signal is a GPS satellite signal that is spread-modulated with a PRN code is determined by determining whether or not the total peak value $P_T$ has exceeded the threshold value $P_\theta$.

Cross-correlation can be appropriately detected without increasing the amount of calculations by utilizing a simple method that selects the maximum integrated correlation value among the integrated correlation values P apart from the total peak value $P_T$ by two or more cells (=one or more chips), and determines whether or not the total peak value $P_T$ has exceeded the threshold value $P_\theta$ that is variably set based on the remote peak value $P_F$. As a result, the positioning accuracy can be improved.

4. Modification 4-1. Electronic Instrument

The invention may be applied to an arbitrary electronic instrument that includes a positioning device. For example, the invention may be similarly applied to a notebook personal computer, a personal digital assistant (PDA), a car navigation system, and the like.

4-2. Satellite Positioning System

The above embodiments have been described taking the GPS as an example of the satellite positioning system. Note that the invention may also be applied to other satellite positioning systems such as the wide area augmentation system (WAAS), the quasi zenith satellite system (QZSS), the global navigation satellite system (GLONASS), and the GALILEO.

4-3. Process Splitting

The host CPU 50 may execute some or all of the processes executed by the CPU 35. For example, the host CPU 50 may execute the PRN code determination process, and the CPU 35 may perform positioning calculations based on the determination result. The host CPU 50 may execute all of the processes executed by the CPU 35 including positioning calculations.

4-4. Number of Cells

The above embodiments have been described taking an example in which the PRN code that includes 1023 chips is divided into two thousand cells. Note that the PRN code may be divided into an arbitrary number of cells. For example, when the PRN code is divided into three thousand cells, the maximum integrated correlation value among the integrated correlation values P corresponding to the cells apart from the total peak cell $C_T$ by three or more cells is selected as the remote peak value $P_F$. Specifically, when the PRN code is divided into M cells, the maximum integrated correlation value among the integrated correlation values P corresponding to the cells apart from the total peak cell $C_T$ by M/1023 or more cells is selected as the remote peak value $P_F$.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A method for a positioning device, comprising:
receiving a positioning signal;
performing correlation calculations on the received positioning signal using a code replica of one spreading code among a plurality of spreading codes;
selecting a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;
changing a threshold value condition for the total peak value based on the remote peak value; and
determining whether or not the received positioning signal is spread-modulated with the one spreading code by determining whether or not the total peak value satisfies the threshold value condition,
the spreading code including a predefined number N of chips, N being an integer;
the performing of the correlation calculations including dividing the spreading code into M cells, M being an integer greater than or equal to N, and performing the correlation calculations while shifting a phase in cell units; and
a third maximum correlation value among correlation values corresponding to cells that are included in the M cells and apart from the phase of the total peak value by M/N or more cells being selected as the remote peak value.

2. A method for a positioning device, comprising:
receiving a positioning signal;
performing correlation calculations on the received positioning signal using a code replica of one spreading code among a plurality of spreading codes;
selecting a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;
changing a threshold value condition for the total peak value based on the remote peak value; and
determining whether or not the received positioning signal is spread-modulated with the one spreading code by determining whether or not the total peak value satisfies the threshold value condition,
the performing of the correlation calculations including integrating correlation values while changing an integration time;
the method further comprising:
determining a type of the remote peak value with respect to the integration time when performing the correlation calculations from a plurality of types that are defined in advance as types of change in correlation value corresponding to the integration time during the correlation calculations; wherein
the changing of the threshold value condition including changing the threshold value condition using a threshold value condition change policy corresponding to the determined type among a plurality of threshold value condition change policies defined in advance corresponding to the plurality of types.

3. The method for the positioning device as defined in claim 2,
the threshold value condition being a condition relating to a relative threshold value of the total peak value with respect to the remote peak value;
each of the plurality of threshold value condition change policies being defined by a function that calculates the relative threshold value and has at least the integration time and the remote peak value as variables;
the changing of the threshold value condition including calculating the relative threshold value by substituting the integration time when performing the correlation calculations and the remote peak value for the variables of the function defined as the threshold value condition change policy corresponding to the determined type; and
the method further comprising:
determining that the received positioning signal is spread-modulated with the one spreading code when a relative value of the total peak value with respect to the remote peak value exceeds the calculated relative threshold value.

4. The method for the positioning device as defined in claim 3,
the types of change in correlation value corresponding to the integration time during the correlation calculations being classified into a first type and a second type, the first type representing a change in correlation value when the total peak value is a correlation value that indicates a signal, and the second type representing a change in correlation value when the total peak value is a correlation value that indicates noise; and
the functions being mathematical models that imitate an actual change in correlation value, the function corresponding to the first type being a linear function, and the function corresponding to the second type being a non-linear function.

5. The method for the positioning device as defined in claim 2,
a lower limit of a signal-to-noise ratio (SNR) of a communication signal that is received when receiving the positioning signal being equal to or lower than −150 dBm.

6. A positioning device comprising:
a receiver section that receives a positioning signal;
a correlation calculation section that performs correlation calculations on the received positioning signal using a code replica of one spreading code among the plurality of spreading codes;
a selection section that selects a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;
a threshold value condition change section that changes a threshold value condition for the total peak value based on the remote peak value;
a signal determination section that determines whether or not the received positioning signal is spread-modulated with the one spreading code by determining whether or not the total peak value satisfies the threshold value condition; and
a positioning section that calculates a position using the determined positioning signal by the signal determination section,
the spreading code including a predetermined number N of chips, N being an integer;
the correlation calculation section dividing the spreading code into M cells, M being an integer greater than or equal to N, and performing the correlation calculations while shifting a phase in cell units; and
the selection section selecting a maximum correlation value among correlation values corresponding to cells that are included in the M cells and apart from the phase of the total peak value by M/N or more cells as the remote peak value.

7. The positioning device as defined in claim 6,
a lower limit of a signal-to-noise ratio (SNR) of a communication signal that can be received by the receiver section being equal to or lower than −150 dBm.

8. An electronic instrument comprising the positioning device as defined in claim 6.

9. A positioning device comprising:
a receiver section that receives a positioning signal;
a correlation calculation section that performs correlation calculations on the received positioning signal using a code replica of one spreading code among a plurality of spreading codes;
a selection section that selects a total peak value and a remote peak value, the total peak value being a first maximum correlation value among correlation values obtained by the correlation calculations, and the remote peak value being a second maximum correlation value among correlation values apart from a phase of the total peak value by a phase equal to or greater than a given phase;

a threshold value condition change section that changes a threshold value condition for the total peak value based on the remote peak value;

a signal determination section that determines whether or not the received positioning signal is spread-modulated with the one spreading code by determining whether or not the total peak value satisfies the threshold value condition; and a positioning section that calculates a position using the determined positioning signal by the signal determination section, the correlation calculation section integrating calculated correlation values while changing an integration time;

the positioning device further comprising:

a correlation value type determination section that determines a type of the remote peak value with respect to the integration time during the correlation calculations performed by the correlation calculation section from a plurality of types that are defined in advance as types of change in correlation value corresponding to the integration time during the correlation calculations; wherein the threshold value condition change section changing the threshold value condition using a threshold value condition change policy corresponding to the type determined by the correlation value type determination section among a plurality of threshold value condition change policies defined in advance corresponding to the plurality of types.

10. The positioning device as defined in claim 9, the threshold value condition being a condition relating to a relative threshold value of the total peak value with respect to the remote peak value;

each of the plurality of threshold value condition change policies being defined by a function that calculates the relative threshold value and has at least the integration time and the remote peak value as variables;

the threshold value condition change section calculating the relative threshold value by substituting the integration time when performing the correlation calculations and the remote peak value for the variables of the function defined as the threshold value condition change policy corresponding to the type determined by the correlation value type determination section; and the signal determination section determining that the received positioning signal is spread-modulated with the one spreading code when a relative value of the total peak value with respect to the remote peak value exceeds the calculated relative threshold value.

11. The positioning device as defined in claim 10, the types of change in correlation value corresponding to the integration time during the correlation calculations being classified into a first type and a second type, the first type representing a change in correlation value when the total peak value is a correlation value that indicates a signal, and the second type representing a change in correlation value when the total peak value is a correlation value that indicates noise; and the functions being mathematical models that imitate an actual change in correlation value, the function corresponding to the first type being a linear function, and the function corresponding to the second type being a non-linear function.

* * * * *